Figure 1:
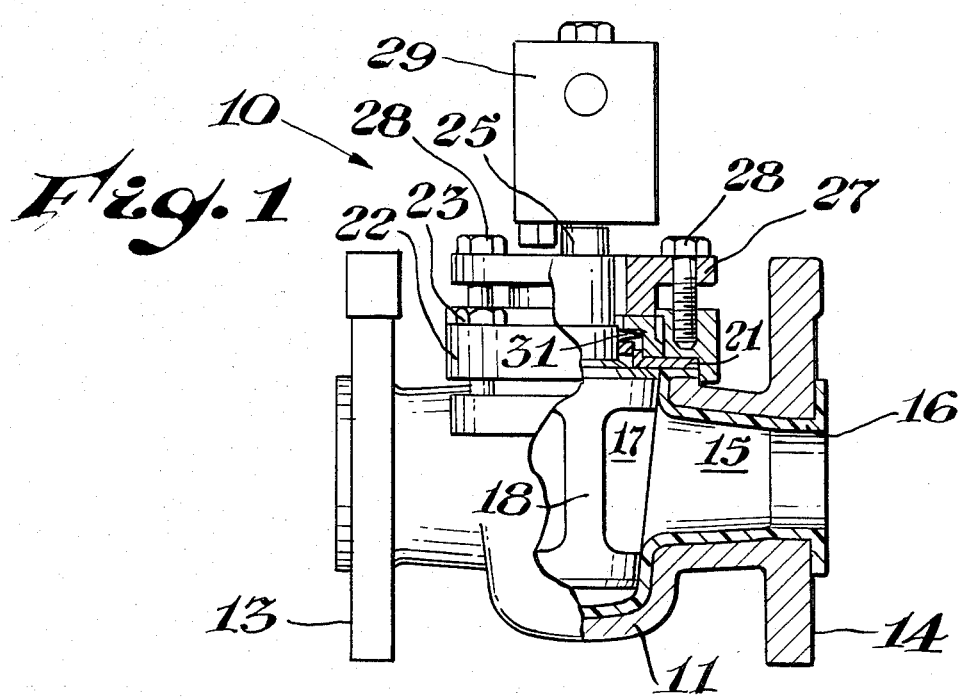

United States Patent [19]

Price

[11] Patent Number: 4,535,803

[45] Date of Patent: Aug. 20, 1985

[54] PLUG VALVE

[75] Inventor: Robert W. Price, Midland, Mich.

[73] Assignee: The Dow Chemical Company, Midland, Mich.

[21] Appl. No.: 590,947

[22] Filed: Mar. 19, 1984

[51] Int. Cl.³ .............................................. F16K 27/00
[52] U.S. Cl. .................................... 137/375; 251/214; 251/312; 277/106; 277/125; 277/188 R
[58] Field of Search ................ 137/375; 251/214, 309, 251/312; 277/105, 106, 125, 188 A, 188 R

[56] References Cited

U.S. PATENT DOCUMENTS

| 3,157,195 | 11/1964 | McIntosh et al. | 137/375 |
| 3,522,820 | 8/1970 | Watts | 251/309 |
| 3,698,422 | 10/1972 | Freed et al. | 137/375 |
| 3,703,910 | 11/1972 | Smith | 137/375 |
| 3,916,943 | 11/1975 | Hester et al. | 137/375 |
| 4,462,568 | 7/1984 | Taylor et al. | 277/188 A |

Primary Examiner—A. Michael Chambers
Assistant Examiner—Sheri Novack
Attorney, Agent, or Firm—R. B. Ingraham

[57] ABSTRACT

A plug valve is provided with a stem seal wherein a generally frustoconical face is provided at the juncture of stem and plug and the seal is fixed against the frustoconical face with a predetermined constant load.

6 Claims, 2 Drawing Figures

PLUG VALVE

Plug valves have found wide use in the handling of a variety of fluids. For many applications a particularly desirable form of plug valve is the so-called plastic lined plug valve. Plastic lining provides a desired degree of chemical resistance for many applications. Generally, such plug valves have a projecting stem affixed to the plug which permits rotation of the plug to provide closure or opening of the valve. A variety of techniques have been used to provide a seal about the stem of such plug valves. Oftentimes such seals have required relatively high maintenance, and oftentimes dynamic seals have been utilized which are prone to leak when first pressurized. Some plastic lined plug valves are disclosed in the following U.S. Pat. Nos.: 3,157,195; 3,698,422; 3,703/910 and 3,916,943, the teachings of which are herewith incorporated by reference thereto.

It would be desirable if there were available an improved stem seal suitable for use in a plastic lined plug valve.

It would also be desirable if there were available an improved plastic lined plug valve capable of extended periods of use with minimal maintenance.

These benefits and other advantages in accordance with the present invention are achieved in a plug valve, the plug valve comprising in cooperative combination a valve body, the body having a first end and a second end, a fluid passageway extending from the first end to the second end, a plug receiving cavity defined by the body with the plug receiving cavity extending generally normally to the axis of the fluid passageway extending from the first end to the second end; a plug disposed within the passageway, the plug having a stem, the stem extending away from said valve body, the valve body and the plug having a synthetic resinous coating thereon, a generally planar seal member disposed over said plug adjacent the stem, a bonnet disposed over said seal member, said bonnet being affixed to the valve body and forcing said sealing member in sealing engagement with the valve body, said bonnet defining a generally centrally disposed stem receiving passageway of a diameter substantially greater than the diameter of the stem; a gland adjustably positionable on said bonnet and extending into the passageway of the bonnet about the stem, the improvement which comprises said plug at a location adjacent the juncture of the plug and the stem defining an annular frustoconical surface having its major diameter adjacent said plug and its minor diameter adjacent said stem; said seal member defining a generally centrally disposed opening therein of sufficient diameter to pass over said stem, the opening being defined by a flexible annular seal portion which when the seal is positioned against the plug, the flexible annular seal portion conforms to the annular frustoconical surface, a retaining ring having an inside diameter approximating the major diameter of the frustoconical surface; a cup seal of annular configuration having a trapazoidal cross section disposed against the sealing member and having a face generally parallel to the frustoconical surface, the cup seal being restrained from radial movement by said annular retaining ring, said cup seal being of a pressure deformable synthetic resinous material, a rigid annular cup seal support ring disposed adjacent said cup seal and remote from said plug; means to resiliently tension the cup seal support ring toward said plug to thereby provide a plug valve with a reduced tendency to leak and desirable service life.

Figure 2:
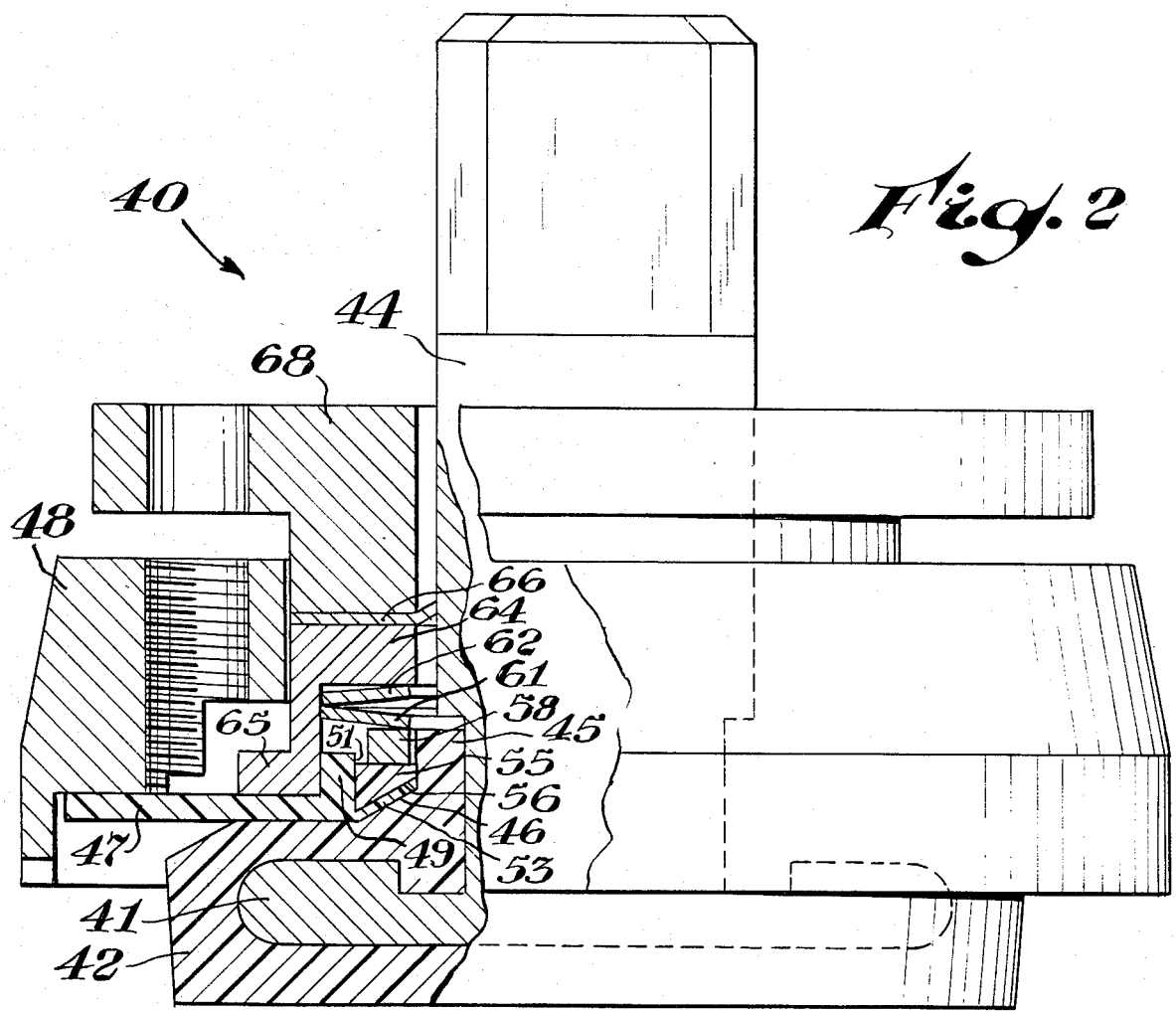

Further features and advantages of the present invention will become more apparent from the following specification taken in connection with the drawing wherein:

FIG. 1 is a longitudinal sectional view of a valve in accordance with the present invention; and FIG. 2 is a fractional sectional view of a plug bonnet and seal assembly.

In FIG. 1 there is schematically depicted a sectional view of a plastic lined plug valve generally designated by the reference numeral 10. The valve 10 has a valve body 11. The valve body 11 has a first end 13 and a second end 14. The body 11 defines a passageway 15 extending between end 13 and end 14. The body 15 has disposed therein a plastic liner 16. The body 11 defines a plug receiving cavity 17 having disposed therein a plastic coated plug 18. As depicted in FIG. 1, the plug 18 is in the closed position. A seal member 21 is disposed over the plug 18 and is held in sealing engagement with a portion of the liner 16 by means of a valve bonnet 22. The valve bonnet 22 is held to the body by means of 4 bolts 23, only one shown. The valve plug 18 is of tapered configuration wherein the major diameter is disposed adjacent the seal 21. Adjacent the seal 21 a stem 25 is affixed to the plug 18, the plug 18 and adjacent portion of the stem 25 having disposed thereon a chemically resistant plastic coating. A gland 27 is adjustably affixed to the bonnet 22 by means of 2 bolts 28, two shown. An operating handle assembly 29 is affixed to the stem 25. A live load stem seal assembly 31 is disposed generally adjacent a location where the stem joins the plug.

In FIG. 2 there is depicted a section fraction view of a live load seal assembly such as the assembly 31 of FIG. 1, the seal assembly generally designated by the reference numeral 40. The seal assembly 40 comprises in cooperative combination a valve plug 41 having disposed thereon a coating 42 of synthetic resinous thermoplastic material. The plug 41 has affixed thereto a stem 44. The stem 44 adjacent the plug 41 defines a generally annular recess into which a portion 45 of the coating material 42 of the plug 41 has been placed. The coating 42 at a location adjacent both plug and stem and coating portion 45 defines a generally annular frustoconical sealng surface 46. Surrounding the stem 44 and adjacent the frustoconical surface 46 is a generally planar seal member 47. The seal member 47 is generally equivalent to the seal member 41 of the FIG. 1 and in operation is affixed to the valve body by bonnet 48. Seal member 47 defines a generally annular retainer ring 49. The retainer ring 49 has a generally cylindrical surface 51 facing toward the stem 44. Within the retainer ring 49 of the seal 47 is a thin flexible portion of the seal 47 defining a sealing lip 53 which conforms to the frustoconical surface 46. Adjacent the sealing lip and remote from the plug 41 is a cup seal 55, the cup seal 55 being of flexible synthetic resinous material as is the seal 47. The cup seal 55 has a generally annular configuration and a trapazoidal cross section, and having one face 56 disposed generally parallel to surface 46 and disposed on the lip seal 53 remote from the surface 46. Disposed on the cup seal 55 remote from surface 56 is a cup seal support ring 58. The cup seal support ring advantageously is of metal such as steel and has an annular configuration with a diameter approximating that of the cup seal. Adjacent the cup seal support ring is a first cone spring washer frequently referred to as a Belleville spring, designated by the reference numeral 61. The washer 61 engages the cup seal support ring remote from the cup seal. A second cone spring washer 62 is in contact with the cone spring washer 61 remote from the cup seal support ring 58. A thrust washer 64 is disposed about the stem 44 and engages the cone spring washer 62 at a location remote from the cup seal support ring 58. The thrust washer 64 has a generally cup like configuration and the thrust washer encircles the cone spring washer, the cup seal support ring and cup seal and annular retaining ring 49 generally adjacent the seal member 47. The thrust washer defines a seal engaging annular flange 65. Adjacent the thrust washer 64 and remote from the cone spring washer 62 is an antistatic washer 66 which engages the metal of the stem 44 and provides an electrical contact with stem 44. The antistatic washer 66 is maintained in position by gland 68 which is generally equivalent to gland 27 of the FIG. 1.

Valves in accordance with the present invention are readily prepared employing a wide variety of materials. Most commonly ductile iron and steel are utilized for the body, bonnet, gland and plug. The body is generally lined by a well known injection molding process whereas the plug is also coated by means of an injection molding process. The configuration of the plug usually is not critical. The configuration as depicted in FIGS. 1 and 2 is generally referred to as a butter plug configuration wherein the plug has been relieved on sides 180 degrees apart to leave a central vein which when positioned as depicted in FIG. 1 is in the closed position, or alternatively the plug will be a more conventional design wherein a passageway extending generally normal to the axis of generation is formed within the plug. When the plug has been coated by injection molding, the external surface is then machined to the desired dimension. Beneficially a surface having a roughness of about 8 to about 16 micron inches has been found highly satisfactory. Beneficially, the frustoconical surface when projected to the axis of the stem will form an angle of from about 80 to 45 degrees with the axis and preferably an angle of about 55 to 65 degrees. The seals, such as the seals 21 and 47, beneficially are prepared by machining. The sealing lip such as the lip 53 of the seal 47 of FIG. 2 advantageously is relatively thin; for example, 10 to 25 thousandths of an inch will provide desirable service. The cup seal such as the cup seal 55 of FIG. 2 is a synthetic resinous material that is flexible. Particularly desirable materials for seals, cup seals, lining and plug coating include fluorocarbon polymers, polytetrafluoroethylene, polyvinylfluoride, polyvinylidenefluoride, vinylidene chloride polymer, polychlorotrifluoroethylene, polypropylene, low density polyethylene, polyisobutylene, perfluoroalkoxy resin, natural rubber, perbunan, and the like. Plug valves in accordance with the present invention provide a highly desirable service life with minimal leakage and maintenance.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A plug valve, the plug valve comprising in cooperative combination a valve body, the body having a first end and a second end, a fluid passageway extending from the first end to the second end, a plug receiving cavity defined by the body with the plug receiving cavity extending generally normally to the axis of the fluid passageway extending from the first end to the second end; a plug disposed within the passageway, the plug having a stem, the stem extending away from said valve body, the valve body and the plug having a synthetic resinous coating thereon, a generally planar seal member disposed over said plug adjacent the stem, a bonnet disposed over said seal member, said bonnet being affixed to the valve body and forcing said sealing member in sealing engagement with the valve body, said bonnet defining a generally centrally disposed stem receiving passageway of a diameter substantially greater than the diameter of the stem; a gland adjustably positionable on said bonnet and extending into the passageway of the bonnet about the stem, the improvement which comprises said plug at a location adjacent the juncture of the plug and the stem defining an annular frustoconical surface having its major diameter adjacent said plug and its minor diameter adjacent said stem; said seal member defining a generally centrally disposed opening therein of sufficient diameter to pass over said stem, the opening being defined by a flexible annular seal portion which when the seal is positioned against the plug, the flexible annular seal portion conforms to the annular frustoconical surface, a retaining ring having an inside diameter approximating the major diameter of the frustoconical surface; a cup seal of annular configuration having a trapezoidal cross section disposed against the sealing member and having a face generally parallel to the frustoconical surface, the cup seal being restrained from radial movement by said annular retaining ring, said cup seal being of a pressure deformable synthetic resinous material, a rigid annular cup seal support ring disposed adjacent said cup seal and remote from said plug; means to resiliently tension the cup seal support ring toward said plug to thereby provide a plug valve with a reduced tendency to leak and desirable service life.

2. The valve of claim 1 wherein the synthetic resinous material is a fluorocarbon polymer.

3. The valve of claim 1 wherein the annular retaining ring is integral with the seal member.

4. The valve of claim 1 wherein the means to resiliently tension the cup seal support ring comprises at least one cone spring washer.

5. The valve of claim 1 having means to provide an electrical connection between valve stem and bonnet.

6. The valve of claim 1 wherein the frustoconical surface if projected to the axis of rotation of the stem would form an angle of about 55 to 65 degrees therewith.

* * * * *